(12) United States Patent
Aimura et al.

(10) Patent No.: US 8,139,821 B2
(45) Date of Patent: Mar. 20, 2012

(54) VEHICLE PERIPHERY MONITORING DEVICE

(75) Inventors: Makoto Aimura, Saitama (JP);
Nobuharu Nagaoka, Saitama (JP);
Kodai Matsuda, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/119,324

(22) PCT Filed: Jul. 10, 2009

(86) PCT No.: PCT/JP2009/003245
§ 371 (c)(1),
(2), (4) Date: Mar. 16, 2011

(87) PCT Pub. No.: WO2010/047015
PCT Pub. Date: Apr. 29, 2010

(65) Prior Publication Data
US 2011/0170748 A1 Jul. 14, 2011

(30) Foreign Application Priority Data
Oct. 20, 2008 (JP) .................................. 2008-269951

(51) Int. Cl.
*G06K 9/00* (2006.01)
(52) U.S. Cl. .......................................... 382/104; 382/154
(58) Field of Classification Search .................. 382/104, 382/106, 154; 701/301; 340/937
See application file for complete search history.

(56) References Cited

U.S. PATENT DOCUMENTS

| | | | |
|---|---|---|---|
| 6,327,536 B1 | 12/2001 | Tsuji et al. | 701/310 |
| 2003/0209893 A1 | 11/2003 | Breed et al. | 280/735 |
| 2009/0046924 A1 | 2/2009 | Morimitsu | 382/154 |

FOREIGN PATENT DOCUMENTS

| | | |
|---|---|---|
| JP | 2000-266539 A | 9/2000 |
| JP | 2001-006096 A | 1/2001 |
| JP | 2001-169310 A | 6/2001 |
| JP | 2009-008539 A | 1/2009 |

OTHER PUBLICATIONS

Young-Chul Lim et al.: "Distance Estimation Algorithm for Both Long and Short Ranges Based on Stereo Vision System", Intelligent Vehicles Symposium, 2008 IEEE, IEEE, Piscataway, NJ, USA, Jun. 4, 2008, pp. 841-846, XP031318835, ISBN: 978-1-4244-2568-6.
Christopher Geyer et al., "The Recursive Multi-Frame Planar Parallax Algorithm", 3D Data Processing, Visualization, and Transmission, Third International Symposium on, IEEE, PI, Jun. 1, 2006, pp. 17-24, XP031078919, ISBN: 978-0-7695-2825-0.

*Primary Examiner* — Andrew W Johns
(74) *Attorney, Agent, or Firm* — Carrier Blackman & Associates, P.C.; Joseph P. Carrier; William D. Blackman

(57) ABSTRACT

A vehicle periphery monitoring device includes: a parallax calculating unit which extracts a first image section that contains a target object in real space from a first image imaged by a first imaging unit at a predetermined time and extracts a second image section correlated to the first image section from a second image imaged by a second imaging unit at the predetermined time, and then calculates the parallax between the first image section and the second image section; a parallax gradient calculating unit for calculating a parallax gradient based on a time series calculation of the parallax of the identical target object in real space by the parallax calculating unit; and a first distance calculating unit for calculating the distance from the vehicle to the target object on the basis of the parallax gradient and the velocity of the vehicle.

5 Claims, 9 Drawing Sheets

1

VEHICLE PERIPHERY MONITORING DEVICE

PRIORITY CLAIM

The present application is based on and claims the priority benefit of Japanese Patent Application No. 2008-269951 filed on Oct. 20, 2008, the contents of which are incorporated herein by reference in its entirety.

BACKGROUND OF THE INVENTION

1. Field of the Invention

The present invention relates to a vehicle periphery monitoring device configured to monitor periphery of a vehicle on the basis of an image imaged by an imaging unit mounted in the vehicle.

2. Description of the Related Art

Hitherto, there has been disclosed a vehicle periphery monitoring device provided with a stereo camera, namely two cameras mounted with optical axes thereof parallel to each other, as a structure to calculate a parallax between an image section of an image of a target object imaged by the right camera and an image section of an image of the identical target object imaged by the left camera, calculate a distance from the vehicle to the target object by the usage of the parallax, and determine contact possibility between the target object and the vehicle on the basis of the calculated distance from the vehicle to the target object (for example, refer to Japanese Patent Laid-open No. 2001-6096).

For the identical target object, when the parallax between the first image section extracted from the image imaged by the right camera and the second image section extracted from the image imaged by the left camera is dx, the distance Z from the vehicle to the target object can be calculated according to the following relational expression (1).

[Relational expression 1]

$$Z = \frac{f}{p} \cdot \frac{D}{dx} \quad (1)$$

Wherein, Z: distance from the vehicle to the target object, f: focal length of camera, p: pixel pitch, D: baseline length of camera, and dx: parallax.

However, in practical, due to the following reasons, such as (a) effect of vibration from the vehicle in travelling, (b) aiming precision when mounting the cameras on the vehicle, (c) effect of correlation calculation when extracting the image sections of the identical target object, there exists an error between an actual distance from the vehicle to the target object (actual distance) and the distance calculated according to the above relational expression (1) (calculated distance).

As shown by the following relational expression (2), the error between the actual distance and the calculated distance affects the relational expression (1) mentioned above as a parallax offset α.

[Relational expression 2]

$$Z = \frac{f}{p} \cdot \frac{D}{dx + \alpha} \quad (2)$$

Especially, as the distance Z from the vehicle to the target object becomes longer, the parallax dx becomes smaller, which makes the effect of the parallax offset α on the above relational expression (2) become remarkable. Thereby, the determination timing on the contact possibility between the target object and the vehicle by the usage of the distance would become irregular, which deteriorates the determination accuracy of the contact possibility.

SUMMARY OF THE INVENTION

The present invention has been accomplished in view of the aforementioned problems, and it is therefore an object of the present invention to provide a vehicle periphery monitoring device capable of reducing an error in calculating a distance from a vehicle to a target object on the basis of a parallax between image sections of the identical target object imaged by two imaging units mounted in the vehicle.

To attain an object described above, the vehicle periphery monitoring device of the present invention is provided as a modification of a vehicle periphery monitoring device configured to monitor a periphery of a vehicle on the basis of images imaged by a first imaging unit and a second imaging unit which are mounted in the vehicle and have an overlapped imaging range.

The vehicle periphery monitoring device of the present invention is provided with a target object extracting unit configured to extract a first image section of a target object in real space from a first image imaged by the first imaging unit at a predetermined time; a corresponding image extracting unit configured to extract a second image section correlated to the first image section from a second image imaged by the second imaging unit at the predetermined time; a parallax calculating unit configured to calculate a parallax between the first image section and the second image section; a parallax variation rate calculating unit configured to calculate a parallax variation rate of parallax per predetermined time interval on the basis of the parallax calculated by the parallax calculating unit in time series for the target object; a velocity detecting unit configured to detect a vehicular velocity of the vehicle; and a first distance calculating unit configured to calculate a distance from the vehicle to the target object on the basis of the parallax variation rate and the vehicular velocity.

According to the present invention, even though a parallax offset occurs between the image section imaged by the first imaging unit for a target object and the image section imaged by the second imaging unit for the identical target object due to effect of vibration from the travelling vehicle mounted with the first imaging unit and the second imaging unit and the like, the parallax variation rate per predetermined time interval when the vehicle is travelling at the predetermined velocity remains constant as the case where there is no parallax offset occurred. The details thereof will be described hereinafter.

On the basis of the parallax variation rate calculated by the parallax variation rate calculating unit and the vehicular velocity detected by the velocity detecting unit, the first distance calculating unit eliminates the effect of the parallax offset, thus, enabling the distance from the vehicle to the target object to be calculated more precisely.

Further, the first distance calculating unit is configured to shift a sampling interval to calculate a theoretical parallax vibration rate on the basis of a theoretical time-series parallax data calculated on assumption that a mounting behavior of the first imaging unit and the second imaging unit satisfies a predetermined condition and the vehicle is travelling at the vehicular velocity detected by the velocity detecting unit, and calculates the distance from the vehicle to the target object on the basis of the theoretical time-series parallax data in a sampling interval wherein the theoretical parallax variation rate matches the parallax variation rate calculated by the parallax variation rate calculating unit.

According to the present invention, the first distance calculating unit shifts a sampling interval to calculate a theoretical parallax variation rate on the basis of the theoretical time-series parallax data, and compares the theoretical parallax variation rate with the parallax variation rate calculated by the parallax variation rate calculating unit. On the basis of the comparison, a theoretical time-series parallax data corresponding to the parallax variation rate calculated by the parallax variation rate calculating unit is determined, which makes it easy to calculate the distance from the vehicle to the target object.

The present invention is provided with a second distance calculating unit configured to calculate a distance from the vehicle to the target object in real space corresponding to the first image section on the basis of one parallax calculated by the parallax calculating unit, and a distance reliability determining unit configured to stop a monitoring process which monitors the target object on the basis of the distance from the vehicle to the target object calculated by the first distance calculating unit on condition that a difference between the distance from the vehicle to the target object in real space calculated by the first distance calculating unit and the distance from the identical target object in real space to the vehicle calculated by the second distance calculating unit is equal to or greater than a first predetermined value.

According to the present invention, the distance from the vehicle to the target object calculated by the second distance calculating unit contains an error caused by the effect of parallax offset between the image sections of the identical target object imaged by the first imaging unit and the second imaging unit, respectively. On the other hand, the distance from the vehicle to the target object calculated by the first distance calculating unit is not affected by the abovementioned parallax offset. Therefore, on condition that the difference between the distance from the vehicle to the target object calculated by the first distance calculating unit and the distance from the identical target object to the vehicle calculated by the second distance calculating unit is greater than the first predetermined value, it can be determined that the parallax offset is greater.

When the parallax offset becomes greater, it is highly possible that there occurs abnormality such as deviation of the mounting position of first imaging unit or the second imaging unit. In this case, the distance reliability determining unit is configured to stop the monitoring process on the target object to prevent the monitoring of the target object to be carried out when the target object is difficult to be detected normally by the first imaging unit or the second imaging unit.

The present invention is provided with an estimated parallax calculating unit configured to calculate an estimated parallax between the first image section and the second image section on the basis of the distance calculated by the first distance calculating unit; and a distance reliability determining unit configured to stop a monitoring process which monitors the target object on the basis of the distance from the vehicle to the target object calculated by the first distance calculating unit on condition that a difference between the parallax calculated by the parallax calculating unit and the estimated parallax is equal to or greater than a second predetermined value.

According to the present invention, the parallax calculated by the parallax calculating unit contains an error caused by the effect of parallax offset between the image sections of the identical target object imaged by the first imaging unit and the second imaging unit, respectively. On the other hand, the estimated parallax between the first image section and the second image section on the basis of the distance calculated by the first distance calculating unit is not affected by the above-mentioned parallax offset. Therefore, on condition that the difference between the parallax calculated by the parallax calculating unit and the estimated parallax calculated by the estimated parallax calculating unit is greater than the second predetermined value, it can be determined that the parallax offset is greater.

When the parallax offset becomes greater, it is highly possible that there occurs abnormality such as deviation of the mounting position of first imaging unit or the second imaging unit. In this case, the distance reliability determining unit is configured to stop the monitoring process on the target object to prevent the monitoring of the target object to be carried out when the target object is difficult to be detected normally by the first imaging unit or the second imaging unit.

The first distance calculating unit is configured to calculate the distance from the vehicle to the target object on the basis of the parallax variation rate and the vehicular velocity on condition that the vehicular velocity is equal to or greater than a predetermined velocity.

According to the present invention, the faster the vehicular velocity becomes, the longer distance is needed to initiate attention attraction for the approaching to the target object. Moreover, the effect of the parallax offset increases as the distance from the vehicle to the target object becomes longer. Therefore, only when the vehicular velocity is equal to or greater than the predetermined velocity, the distance from the vehicle to the target object is calculated precisely by the first distance calculating unit; when the vehicular velocity is smaller than the predetermined velocity, the distance from the vehicle to the target object is calculated by the second distance calculating unit wherein the arithmetic computation for calculating the distance becomes smaller than that of the first distance calculating unit. According thereto, the arithmetic computation for calculating the distance can be reduced when the vehicular velocity is smaller than the predetermined velocity.

BRIEF DESCRIPTION OF THE DRAWINGS

FIG. 5($b$) is an explanatory diagram illustrating the calculation of a theoretical parallax based on a parallax gradient.

DETAILED DESCRIPTION OF THE PREFERRED EMBODIMENTS

Hereinafter, an embodiment of the present invention will be described in detail with reference to FIG. 1 to FIG. 9.

Figure 1:
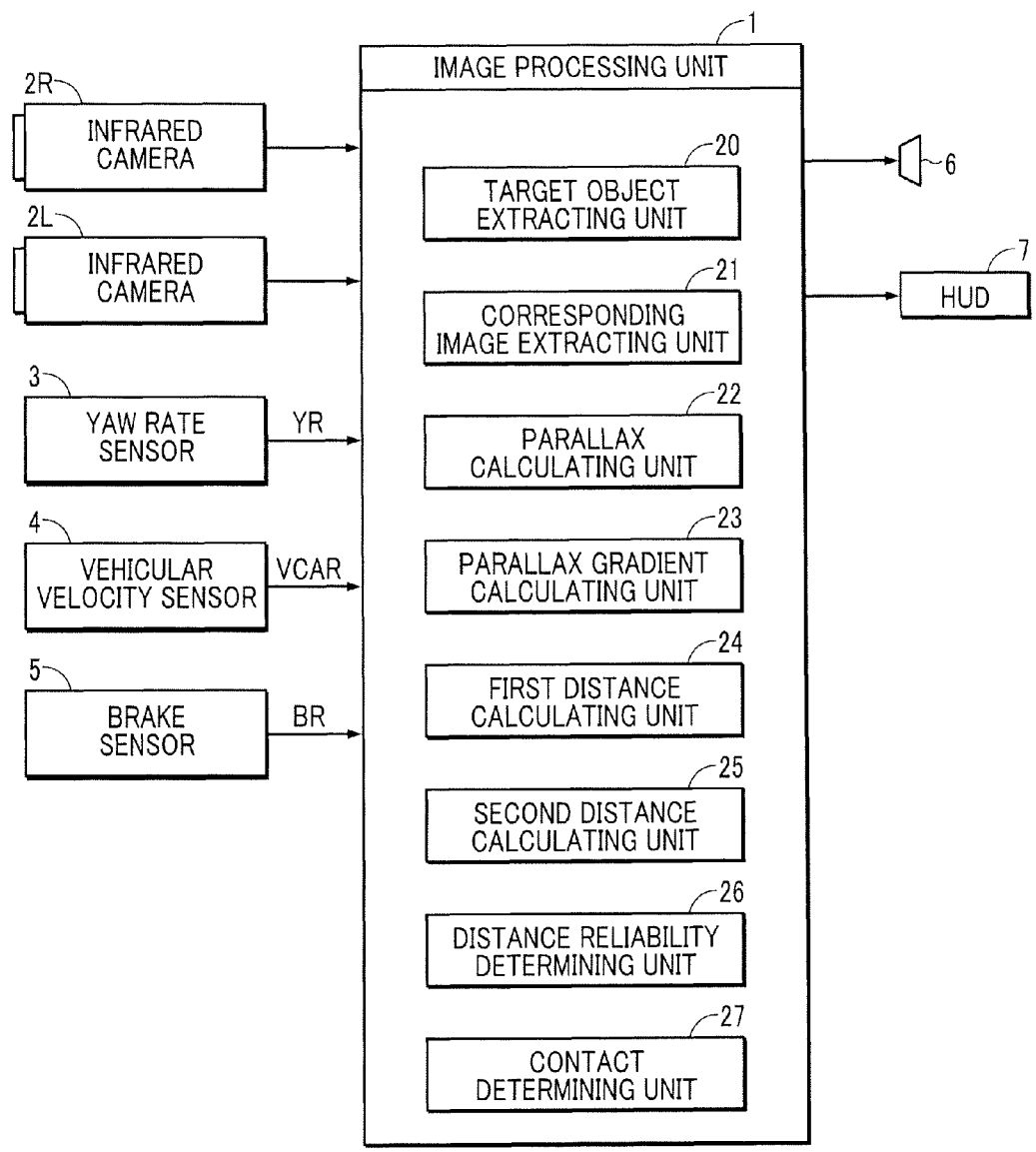
FIG. 1 is a diagram illustration a configuration of a vehicle periphery monitoring device of the present invention.

FIG. 1 is a diagram illustrating a configuration of a vehicle periphery monitoring device of the present invention. The vehicle periphery monitoring device of the present invention is composed of an image processing unit 1. The image processing unit 1 is connected by an infrared camera 2R (equivalent to a first imaging unit of the present invention) and an infrared camera 2L (equivalent to a second imaging unit of the present invention) both capable of detecting far infrared rays, a yaw rate sensor 3 configured to detect a yaw rate of a vehicle, a vehicular velocity sensor 4 (equivalent to a velocity detecting unit of the present invention) configured to detect a travelling velocity of the vehicle, a brake sensor 5 for detecting a manipulated amount of a brake pedal by the driver, a speaker 6 for attracting attention via audio sounds, and a display device 7 (for example, a Head UP Display) for displaying images obtained by the infrared cameras 2R and 2L, and meanwhile visualizing a target object which has a high contact possibility to the driver.

Figure 2:
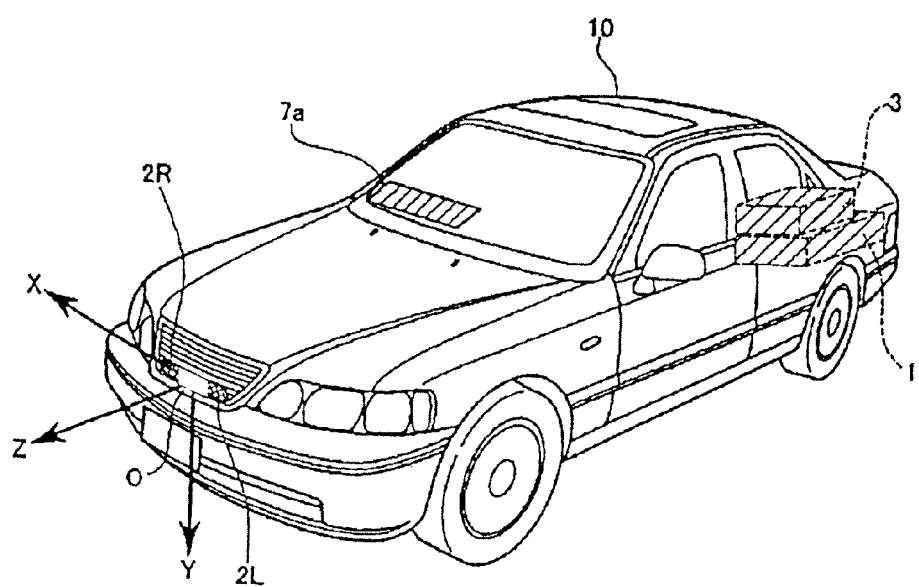
FIG. 2 is an explanatory diagram illustrating a vehicle mounted with the vehicle periphery monitoring device of FIG. 1.

With reference to FIG. 2, the two cameras 2R and 2L are disposed on the front portion of the vehicle roughly symmetrical to the central line in the width direction of the vehicle 10. The two infrared cameras 2R and 2L are fixed in such a way that the optical axes thereof are parallel to each other and the heights from the road surface to the two cameras 2R and 2L are equal. The infrared cameras 2R and 2L have a property of outputting image signals with higher levels (the luminance of the image signals becomes greater) when the temperature of an object to be photographed becomes higher. The display device 7 is disposed so that an image 7a is displayed on the windshield of the vehicle 10 in front of the driver.

With reference to FIG. 1, the image processing unit 1 is an electronic unit composed of a micro computer (not shown) or the like, and has a function causing the micro computer to convert analog image signals output from the infrared cameras 2R and 2L to digital data, store the digital data in an image memory (not shown), and perform various arithmetic computations on the front image of the vehicle stored in the image memory.

By causing the micro computer to execute a vehicle periphery monitoring program, the micro computer functions as a target object extracting unit 20 configured to extract a first image section of a target object in real space from a first image imaged by the infrared camera 2R, a corresponding image extracting unit 21 configured to extract a second image section correlated to the first image section from a second image imaged by the infrared camera 2L, a parallax calculating unit 22 configured to calculate a parallax between the first image section extracted by the target object extracting unit 20 and the second image section extracted by the corresponding image extracting unit 21, a parallax gradient calculating unit 23 configured to calculate a parallax gradient which is a parallax variation rate per predetermined time interval on the basis of the parallax calculated by the parallax calculating unit 22 in time series for the identical target object, a first distance calculating unit 24 configured to calculate a distance from the vehicle 10 to the target object on the basis of the parallax gradient, a second distance calculating unit 25 configured to calculate a distance from the vehicle 10 to the target object on the basis of one parallax data, a distance reliability determining unit 26 configured to determine the reliability of the distance calculated by the first distance calculating unit 24, and a contact determining unit 27 configured to determine the contact possibility between the vehicle 10 and the target object.

Figure 3:
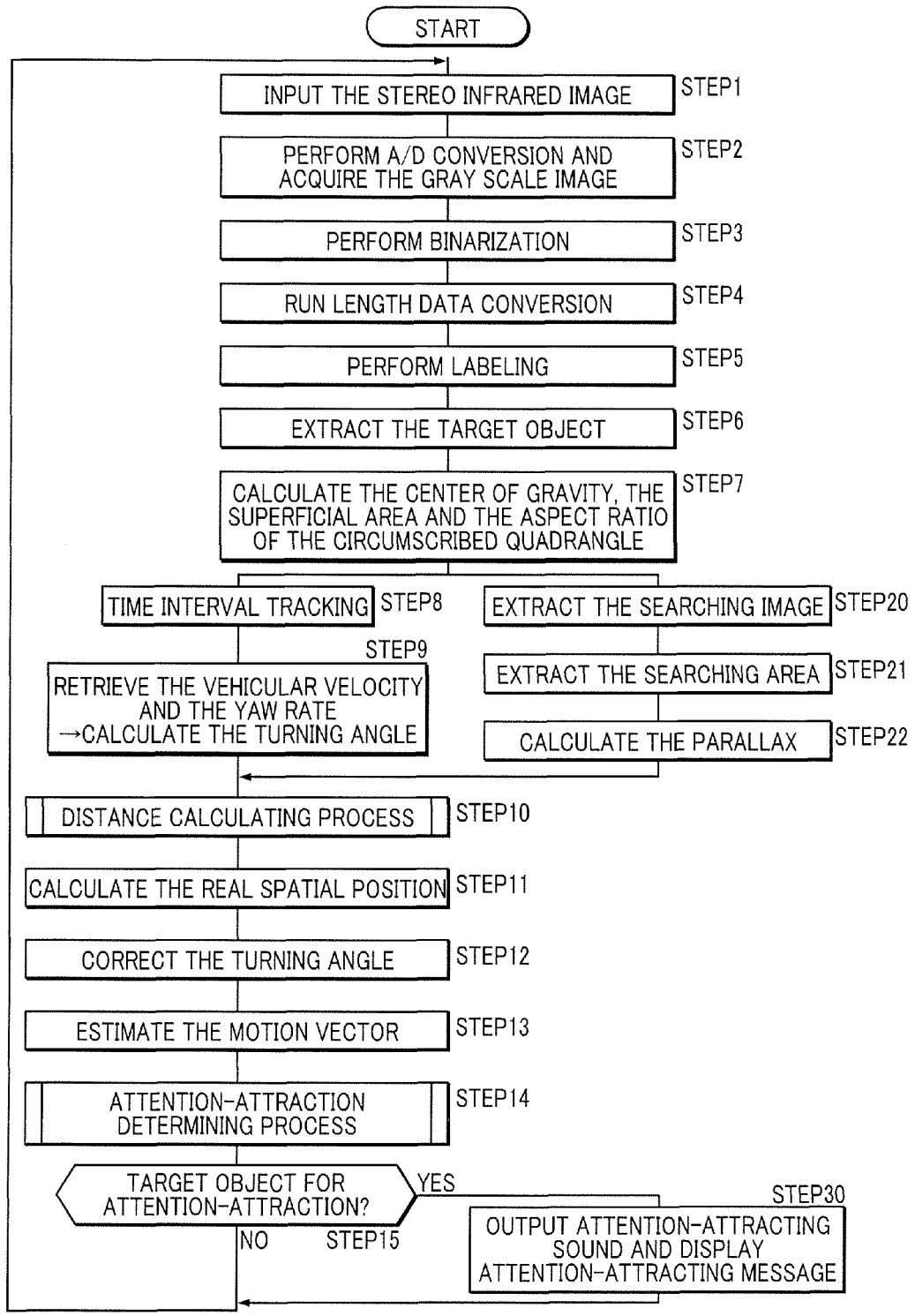
FIG. 3 is a flow chart illustrating a procedure performed by an image processing unit illustrated in FIG. 1.

The monitoring process of the periphery of the vehicle 10 by the image processing unit 1 will be described with reference to the flow chart illustrated in FIG. 3.

Firstly, the image processing unit 1 inputs the analog signals of the infrared images output from the infrared cameras 2R and 2L at STEP 1, and converts the analog signals via A/D conversion to digitalized gray scale images and stores them in an image memory at STEP 2.

At STEP 1 and STEP 2, a gray scale image (referred to as a right image hereinafter, corresponding to the first image of the present invention) imaged by the infrared camera 2R and a gray scale image (referred to as a left image hereinafter, corresponding to the second image of the present invention) imaged by the infrared camera 2L are acquired. Since there is a deviation (parallax) between image sections of the identical target object in the right image and the left image in horizontal direction, the distance from the vehicle 10 to the target object in real space can be calculated according to the parallax.

At subsequent STEP 3, the image processing unit 1 performs a binarization processing (pixels having luminance equal to or greater than a threshold are interpreted as 1 (white), otherwise as 0 (black)) on the right image serving as a reference image to generate a binary image. The procedure from STEP 4 to STEP 6 is carried out by the target object extracting unit 20. At STEP 4, the target object extracting unit 20 runs length data conversion on the image section of each white area contained in the binary image (line data of continuous white pixels in x (horizontal) direction of the binary image).

At STEP 5, the target extracting unit 20 labels lines having overlapped portions of the binary image in y (vertical) direction as one image section, and extracts the labeled image section as a candidate image of the target object to be monitored at STEP 6.

At STEP 7, the image processing unit 1 calculates the center of gravity G, the superficial area S and the aspect ratio (ASPECT) of the circumscribed quadrangle for each candidate image. The specific calculation method is omitted here since it has been described in detail in Japanese Patent Laid-open No. 2001-6069 mentioned above. Thereafter, the image processing unit 1 carries out the procedure from STEP 8 to STEP 9 and the procedure from STEP 20 to STEP 22 concurrently.

At STEP 8, the image processing unit 1 carries out identity determination on the image sections extracted from the binary images which are obtained from the infrared cameras 2R and 2L every predetermined sampling period. The image processing unit 1 stores the time-series data of positions (positions of the center of gravity) of the image sections which have been determined to be of the identical target object (time interval tracking). At STEP 9, the image processing unit 1 reads in the vehicular velocity VCAR detected by the velocity sensor 4 and the yaw rate YR detected by the yaw rate sensor 3, and calculates the turning angle θr of the vehicle 10 by integrating the yaw rate YR over time.

Figure 4:
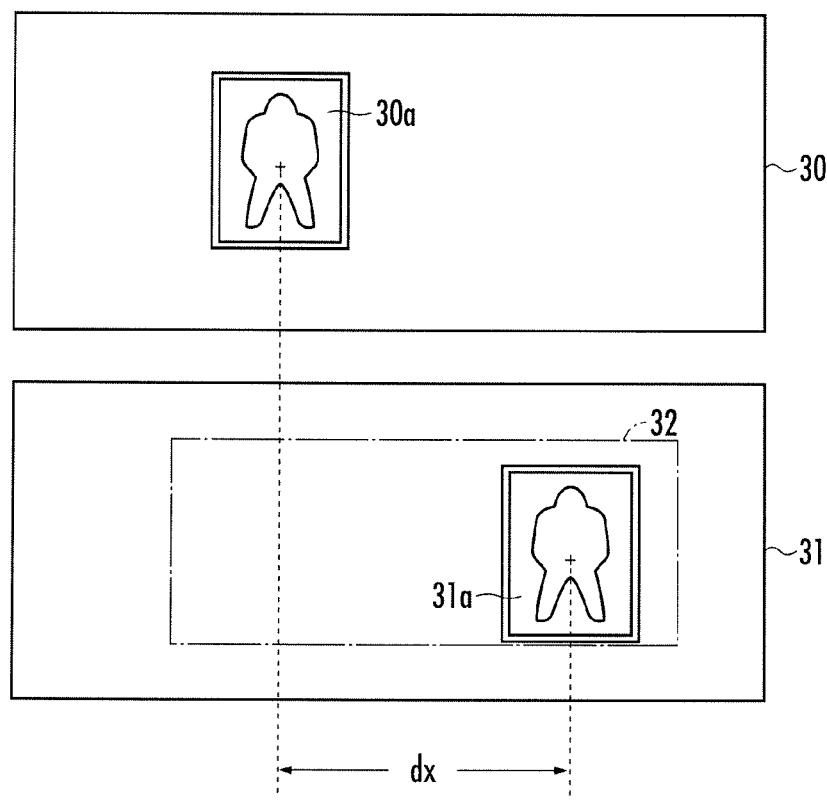
FIG. 4 is an explanatory diagram illustrating an image extraction process by a corresponding image extracting unit and a parallax between extracted images.
Figure 5:
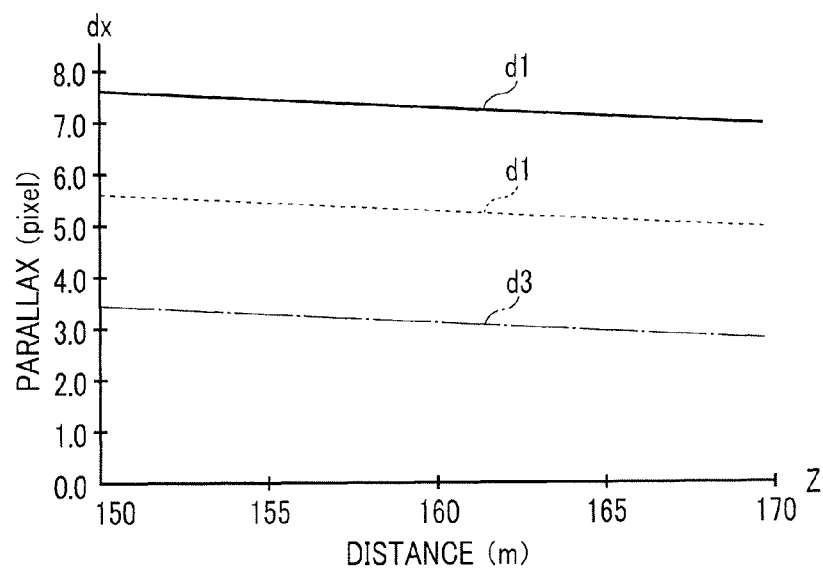
FIG. 5($a$) is an explanatory diagram illustrating the effect caused by a parallax offset.
Figure 5:
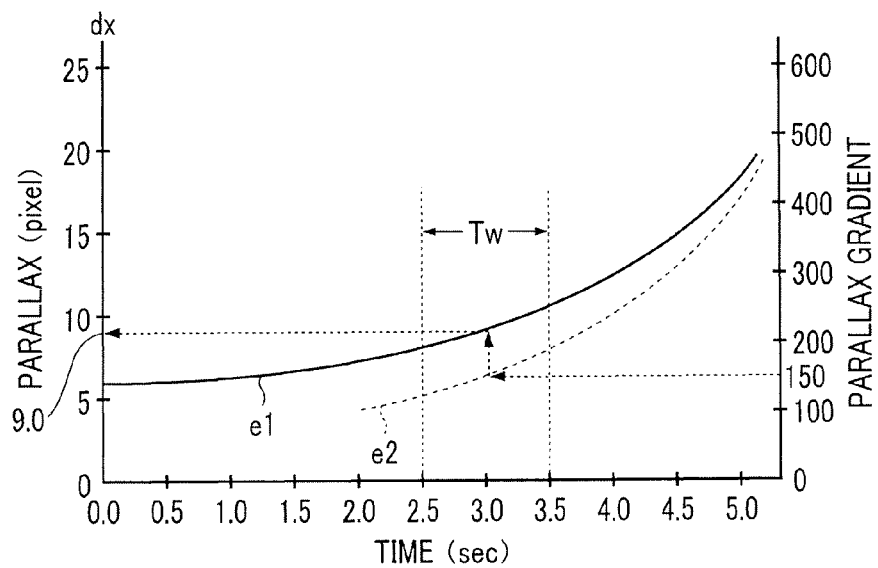

The procedure from STEP 20 to STEP 21 is performed by the corresponding image extracting unit 21. With reference to FIG. 4, at STEP 20, the corresponding image extracting unit 21 selects one image of the target object from the candidate images extracted by the target object extracting unit 20. Subsequently, the corresponding image extracting unit 21 extracts from the gray scale image 30 of the right image a searching image 30a (entire area enclosed by the circumscribed quadrangle in the selected candidate image, corresponding to the first image section of the present invention).

At STEP 21, the corresponding image extracting unit 21 sets a searching area 32 for searching an image corresponding to the searching image 30a from the gray scale image 31 of the left image, and computes correlation of the image to the searching image 30a to extract a corresponding image 31a (corresponding to the second image section of the present invention).

At STEP 22, the parallax calculating unit 22 calculates the difference between the position of the center of gravity of the searching image 30a and the position of the center of gravity of the corresponding image 31a as the parallax dx, and the procedure moves to STEP 10.

At STEP 10, the image processing unit 1 performs a distance calculating process for calculating the distance from the vehicle 10 to the target object corresponding to the searching image 30a and the corresponding image 31a in real space. The distance calculating process will be described hereinafter.

STEP 11 to STEP 15 and STEP 30 are performed by the contact determining unit 27. At STEP 11, the contact determining unit 27 converts the coordinate (x, y) of the searching image 30a and the distance z from the vehicle 10 to the target object calculated at STEP 10 to real spatial coordinate (X, Y, Z) and calculates the positional coordinate of the target object corresponding to the searching image 30a in real space.

As illustrated in FIG. 2, the real spatial coordinate (X, Y, Z) is defined in such a way that the central point between the mounting positions of the infrared cameras 2R and 2L is set as the origin O, the width direction of the vehicle 10 is set as X direction, the vertical direction is set as Y direction and the frontal direction of the vehicle 10 is set as Z direction. The image coordinate is defined by setting the center of the image as the origin, the horizontal direction as x direction and the vertical direction as y direction.

At STEP 12, the contact determining unit 27 performs turning angle correction for correcting the positional deviation in the image due to the turning of the vehicle 10. At STEP 13, the contact determining unit 27 calculates the relative motion vector between the target object and the vehicle 10 on the basis of the time-series positional data of the identical target object in real space obtained from a plurality of images imaged in a predetermined monitoring period after the turning angle correction has been performed on the time-series positional data.

The specific calculation methods of the real spatial coordinate (X, Y, Z) and the motion vector of the target object are omitted here since they have been described in detail in Japanese Patent Laid-open No. 2001-6069 mentioned above.

At STEP 14, the contact determining unit 27 determines the contact possibility between the vehicle 10 and the target object and executes an attention-attraction determining process to determine whether or not the attention-attraction is necessary. When it is determined that the attention-attraction is necessary according to the attention-attraction determining process, the process branches to STEP 30 where the attention-attracting audio sounds are output from the speaker 6 and the attention-attracting messages are displayed on the display device 7. On the other hand, when it is determined that the attention-attraction is unnecessary according to the attention-attraction determining process, the process returns to STEP 1, the image processing unit 1 does not perform the attention-attraction.

In the attention-attraction determining process, the image processing unit 1 determines the contact possibility of the target object to the self vehicle 10 in a given time, whether or not the target object is in a contiguity determination region set around the self vehicle, the contact possibility when the target object enters the contiguity determination region and have contact to the self vehicle 10, whether or not the target object is a pedestrian, whether the target object is an artificial structure and the like so as to determine whether it is necessary to perform the attention-attraction.

The specific contents of the attention-attraction determining process are omitted here since they have been described in detail in Japanese Patent Laid-open No. 2001-6069 mentioned above as the alarm determining process.

Hereinafter, the description will be carried out on the distance calculating process at STEP 10 of FIG. 3 with reference to FIG. 5 to FIG. 9. As illustrated in FIG. 4, for the identical target object in real space, if the parallax dx between the searching image 30a extracted from the right image and the corresponding image 31a extracted from the left image 31 is calculated out, the distance Z from the vehicle 10 to the target object can be basically calculated according to the relational expression (3) below.

[Relational expression 3]

$$Z = \frac{f}{p} \cdot \frac{D}{dx} \qquad (3)$$

Wherein, Z: the distance from the vehicle 10 to the target object, f: the focal length of the infrared cameras 2R and 2L, p: the pixel pitch of the infrared cameras 2R and 2L, D: the baseline length of the infrared cameras 2R and 2L, and dx: the parallax.

However, in practical, due to the following reasons, such as (a) effect of vibration from the vehicle 10 in travelling, (b) aiming precision when mounting the infrared cameras 2R and 2L on the vehicle 10, (c) effect of correlation calculation when extracting the image sections of the identical target object by the corresponding image extracting unit 21, there exists an error between an actual distance from the vehicle to the target object (actual distance) and the distance calculated according to the above relational expression (3) (calculated distance).

As shown by the following relational expression (4), the error between the actual distance and the calculated distance affects the relational expression (3) mentioned above as a parallax offset α.

[Relational expression 4]

$$Z = \frac{f}{p} \cdot \frac{D}{dx + \alpha} \qquad (4)$$

Especially, as the distance Z from the vehicle 10 to the target object becomes longer, the parallax dx becomes smaller, the effect of the parallax offset α on the above relational expression (4) becomes remarkable. Thereby, the determination timing on the contact possibility between the target object and the vehicle 10 performed by the contact determining unit 27 by the usage of the calculated distance would become irregular, which deteriorates the determination accuracy of the contact possibility between the vehicle 10 and the target object.

FIG. 5(a) illustrates the relationship between the distance Z and the parallax dx when the vehicle 10 is travelling, for example, at 72 km/h with the parallax dx being set as the vertical axis and the distance Z from the vehicle 10 to the target object being set as the horizontal axis. In the drawing, d1 represents the situation where the parallax offset α=0, d2 represents the situation where the parallax offset α=−2 (pixel), and d3 represents the situation where the parallax offset α=−4 (pixel).

It is obvious from FIG. 5(a) that since the parallax dx corresponding to the distance varies according to the parallax offset a, the calculation error of the distance occurs. For example, when the distance from the actual vehicle 10 to the target object is 150 m, the calculated distance becomes 205 m if the parallax offset α=−2 (pixel) and the calculated distance becomes 322 if the parallax offset α=−4 (pixel).

However, the parallax gradient does not vary with the parallax offset. Thereby, the first distance calculating unit 24 calculates the parallax gradient on the basis of the parallax time-series data and calculates the distance from the vehicle 10 to the target object by using the parallax gradient, thereby, to eliminate the effect of the parallax offset α.

Figure 6:
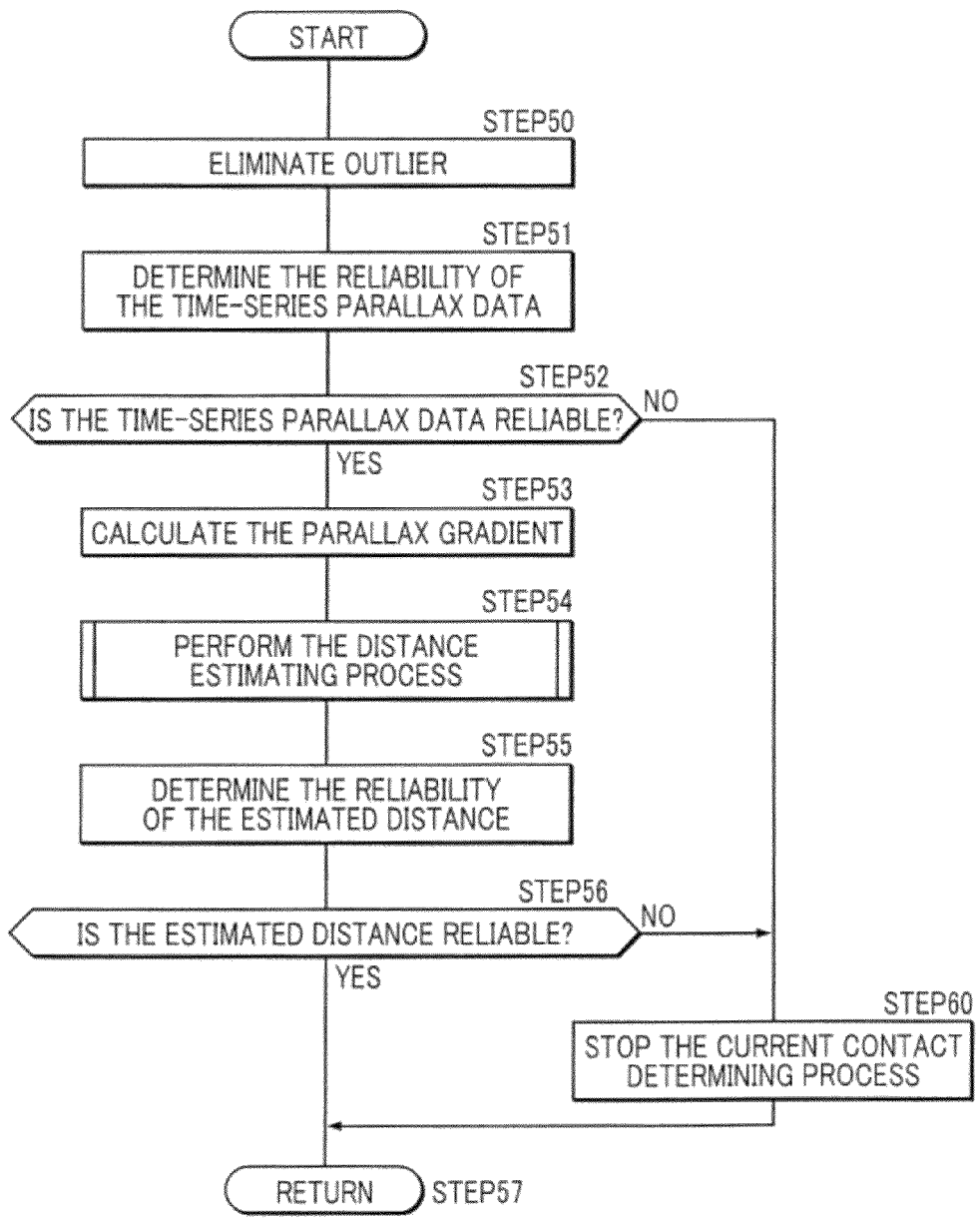
FIG. 6 is a flow chart of a procedure wherein the parallax gradient is calculated according to the determination of the reliability of a parallax time-series data, and the reliability of an estimated distance to a target object is determined according to the parallax gradient.

The first distance calculating unit 24 calculates the distance from the vehicle 10 to the target object by using the parallax gradient according to the flow chart illustrated in FIG. 6. At STEP 50, the first distance calculating unit 24 performs an outlier elimination process which eliminates those data without a calculated parallax (when the correlation computation by the corresponding image extracting unit 21 was failed) and those data with the parallax extremely deviated from the others from the parallax time-series data calculated by the parallax calculating unit 22 in a predetermined time-series time interval Ts (for example, in 1 second).

At STEP 51, the first distance calculating unit 24 determines the reliability of the parallax time-series data on the basis of the numbers of the parallax time-series data, the degree of correlation in the correlation computation for the parallax and the like. If the parallax time-series data is determined to be reliable at STEP 52, the process moves to STEP 53. On the opposite, if the parallax time-series data is determined to be unreliable at STEP 52, the process branches to STEP 70 where the contact determining process by the contact determining unit 27 on the basis of the current parallax time-series data is stopped.

At STEP 53, the first distance calculating unit 24 calculates the parallax gradient on the basis of the parallax time-series data, and estimates the distance from the vehicle 10 to the target object on the basis of the parallax gradient at STEP 54. The distance estimating process at STEP 54 will be described in detail hereinafter.

STEP 55 is performed by the distance reliability determining unit 26. The distance reliability determining unit 26 compares the distance Z1 from the vehicle 10 to the target object calculated by the first distance calculating unit 24 by using the parallax gradient and the distance Z2 from the vehicle 10 to the target object calculated by the second distance calculating unit 25 according to the relational expression (3) by using for example an intermediate value of the parallax time-series data.

When the difference between Z1 and Z2 is out of a predetermined range (intrinsic range of the vehicle 10 varying according to the mounting precision of the infrared cameras 2R and 2L, the vibration of the vehicle and the like, corresponding to equal to or smaller than the first predetermined value of the present invention), the distance reliability determining unit 26 determines that the parallax offset α is greater and the reliability of Z1 is low. When the reliability of Z1 is determined to be low by the distance reliability determining unit 26 at STEP 56, the process branches to STEP 60 where the current contact determining process is stopped. On the other hand, when the reliability of Z1 is determined to be high at STEP 56, the process moves to STEP 57 where the contact determining unit 27 performs the contact determining process after STEP 11 of FIG. 3.

Figure 7:
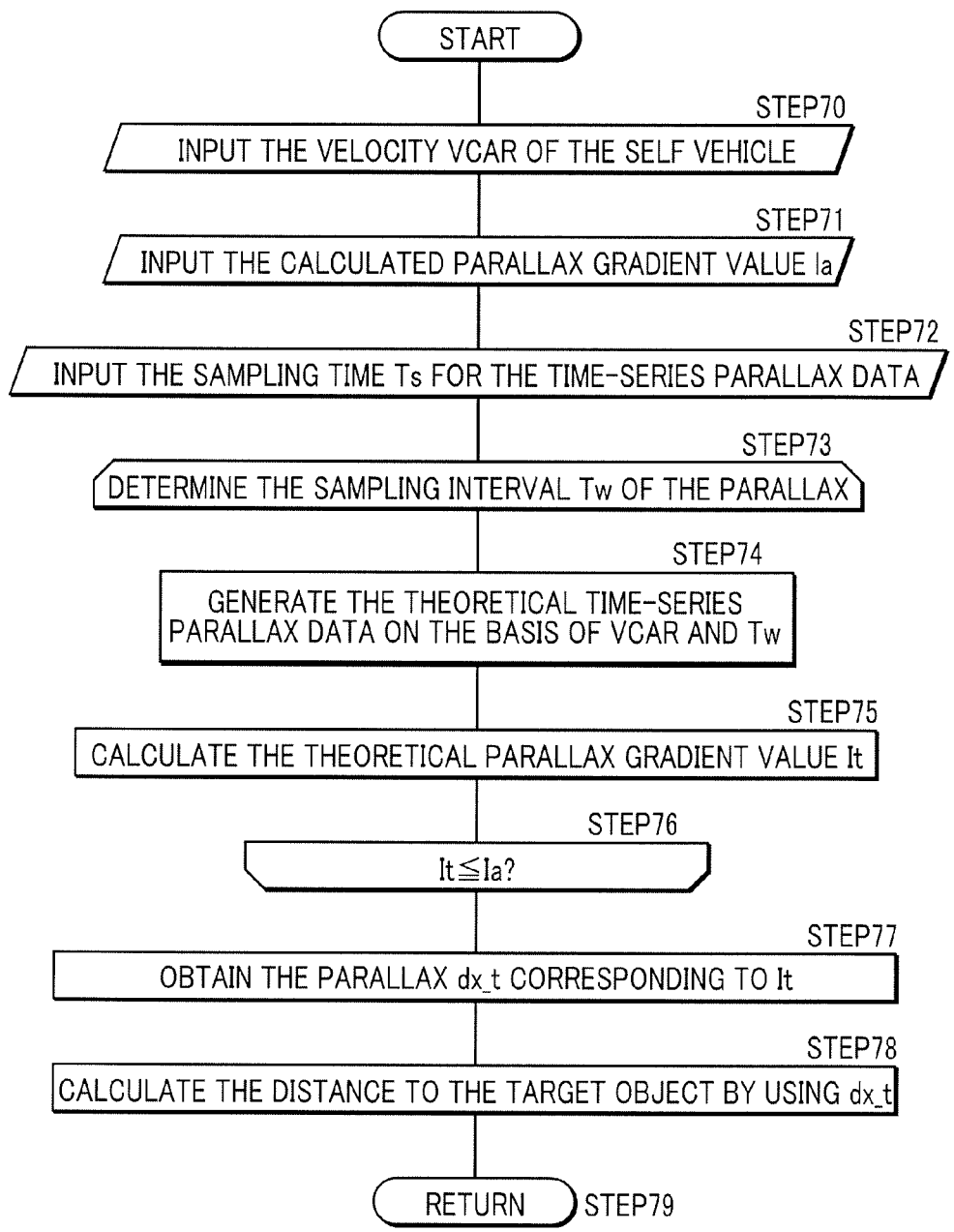
FIG. 7 is a flow chart illustrating a procedure for obtaining a distance to the target object on the basis of the parallax gradient.
Figure 8:
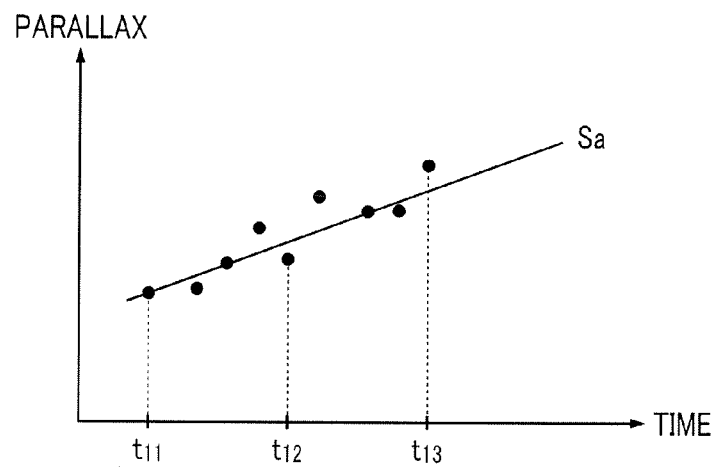
FIG. 8a and FIG. 8b illustrate the distribution of the parallax time-series data with the parallax set as the vertical axis and the time set as the horizontal axis.
Figure 8:
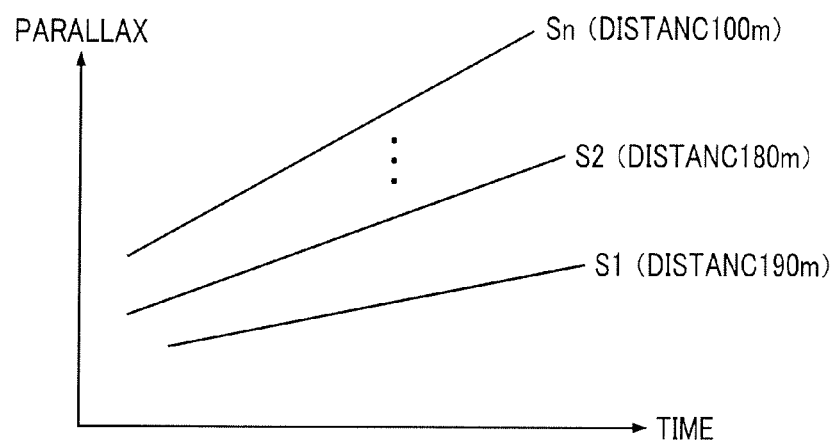

Hereinafter, the distance estimating procedure performed by the first distance calculating unit 24 at STEP 54 of FIG. 6 will be described with reference to FIG. 7. At STEP 70, the first distance calculating unit 24 is input with the travelling velocity VCAR calculated by the velocity sensor 4. At STEP 71, the first distance calculating unit 24 is input with the calculated value Ia of the parallax gradient calculated at STEP 53 of FIG. 6 and the time Ts (the sampling time for the parallax time-series data) (for example, 1 second) at STEP 72.

Thereafter, the first distance calculating unit 24 repeats the loop from STEP 73 to STEP 76 to calculate the parallax corresponding to the calculated value Ia of the parallax gradient. FIG. 5(b) illustrates the variation between the parallax and the parallax gradient satisfying conditions that the parallax offset α=0 (corresponding to the case where the mounting behavior of the first imaging unit and the second imaging unit to the vehicle satisfies a predetermined condition of the present invention) and the vehicle 10 is travelling at 100 km/h with respect to a motionless target object. The parallax is set as the left vertical axis, the parallax gradient is set as the right vertical axis and the time is set as the horizontal axis. In the drawing, e1 represents the parallax time-series data (theoretical parallax time-series data), and e2 represent the parallax gradient (theoretical parallax gradient).

In the loop from STEP 73 to STEP 76, the first distance calculating unit 24 sets the sampling time interval Tw of the parallax by shifting the sampling time Ts (for example, 1 second) from 5 second of FIG. 5(b) to 0 second (for example, 4~5 second, 3.5~4.5 second, 3.0~4.0 second, 2.5~3.5 second, . . . ) at STEP 73. At STEP 74, the first distance calculating unit 24 generates theoretical parallax time-series data in the sampling time interval Tw on the basis of the velocity VCAR of the vehicle 10 and the sampling time interval Tw.

At STEP 75, the first distance calculating unit 24 calculates the theoretical value It of the parallax gradient on the basis of the theoretical parallax time-series data in each sampling time interval Tw, and determines whether or not the calculated value Ia of the parallax gradient is equal to or greater than the theoretical value It at STEP 76.

When the calculated value Ia of the parallax gradient is equal to or greater than the theoretical value It at STEP 76, the process leaves the loop and moves to STEP 77. When the calculated value Ia of the parallax gradient is smaller than the theoretical value It, the process returns to STEP 73 where a subsequent sampling time interval Tw is set to perform the steps after the STEP 74.

At STEP 77, the first distance calculating unit 24 acquires a parallax dx_t corresponding to the last theoretical value It of the parallax gradient calculated in the loop from STEP 73 to STEP 76. For example, as illustrated in FIG. 5(a), when the calculated value Ia of the parallax gradient is 150, 9.0 is acquired as the parallax of the theoretical time-series data in 3.0 second which is the intermediate value of the sampling time interval Tw (2.5~3.5 second) where the calculated value Ia of the parallax gradient is equal to or greater than the theoretical value It.

At STEP 78, the first distance calculating unit 24 assigns the parallax of 9.0 into the relational expression (3) to calculate the distance from the vehicle to the target object.

Hereinafter, another embodiment where the distance from the vehicle to the target object is estimated from the parallax gradient is described with reference to FIGS. 8a and 8b, and FIG. 9.

FIG. 8(a) and FIG. 8(b) illustrate the distribution of the parallax time-series data with the parallax set as the vertical axis and the time set as the horizontal axis. In FIG. 8(a), a straight line Sa is obtained from 9 calculated parallax data in the sampling time interval from t11 to t13.

FIG. 8(b) illustrates straight lines having the theoretical parallax gradient when the parallax offset α=0 for each of the distances from the vehicle to the target object. S1 is a straight line with the distance set at 190 m. S2 is a straight line with the distance set at 180 m. Sn is a straight line with the distance set at 100 m.

The first distance calculating unit 24 selects a straight line having the same parallax gradient as that of the straight line Sa generated from the parallax time-series data as illustrated in FIG. 8(a) from the straight lines of S1 to Sn illustrated in FIG. 8(b), and the distance for the selected straight line can be obtained as the distance from the vehicle 10 to the target object.

Figure 9:
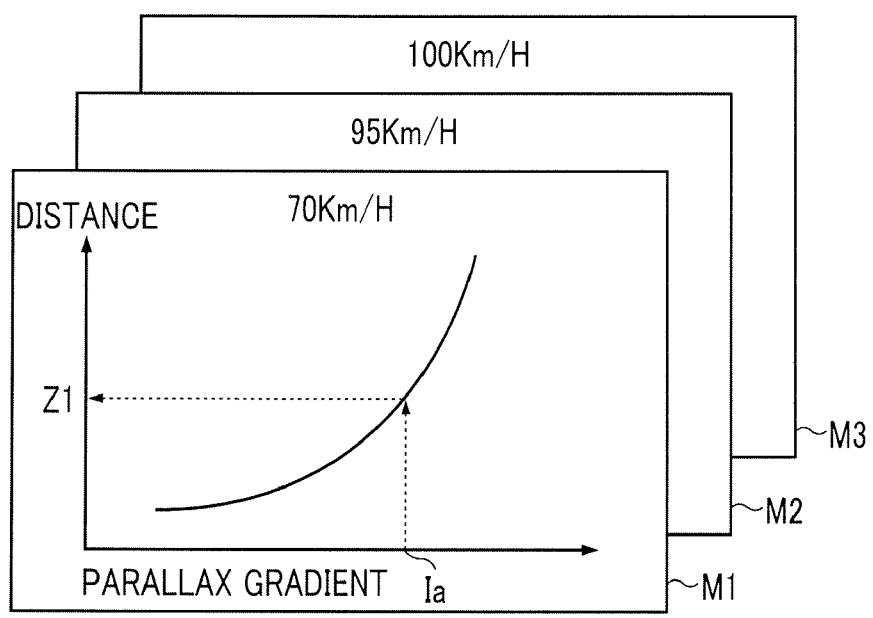
FIG. 9 is an explanatory diagram for obtaining a distance to the target object on the basis of the parallax gradient.

FIG. 9 illustrates preliminarily prepared correlation maps M1, M2, M3, . . . between the parallax gradient and the distance to the target object for every travelling velocity of the vehicle 10 (in FIG. 9, 70 km/h, 95 km/h and 100 km/h). The first distance calculating unit 24 applies the parallax gradient calculated from the parallax time-series data to the correlation map selected according to the travelling velocity of the vehicle 10 to obtain the distance from the vehicle 10 to the target object.

For example, when the travelling velocity of the vehicle 10 is 70 km/h and the parallax gradient calculated from the parallax time-series data is Ia, the first distance calculating unit 24 obtains the distance Z1 from the vehicle 10 to the target object by applying the parallax gradient Ia to the selected correlation map M1 of FIG. 9.

In the abovementioned embodiments, the distance reliability determining unit 26 determines the reliability of the distance Z1 by comparing the distance Z1 from the vehicle 10 to the target object calculated by the first distance calculating unit 24 by using the parallax gradient and the distance Z2 from the vehicle 10 to the target object calculated by the second distance calculating unit 25 according to the relational expression (3) by using for example the intermediate value of the parallax time-series data; however, it is acceptable to determine the reliability of the distance Z1 according to the other methods. Hereinafter, another method for determining the reliability of the distance Z1 by the distance reliability determining unit 26 will be described.

At STEP 55 of FIG. 6, the distance reliability determining unit 26 assigns the distance Z1 to the vehicle 10 calculated by the first distance calculating unit 24 by using the parallax gradient to the following relational expression (5) which is a reverse expression of the abovementioned relational expression (3) to calculate an estimated parallax dx' corresponding to the distance Z1 and compares the estimated parallax dx' with the parallax dx calculated by the parallax calculating unit 22. The configuration for calculating the estimated parallax according to the relational expression (5) corresponds to the estimated parallax calculating unit of the present invention.

[Relational expression 5]

$$dx' = \frac{f}{p} \cdot \frac{D}{Z1} \quad (5)$$

Wherein, dx': the estimated parallax, f: the focal length of the infrared cameras 2R and 2L, p: the pixel pitch of the infrared cameras 2R and 2L, D: the baseline length of the infrared cameras 2R and 2L, and Z1: the distance from the vehicle 10 to the target object calculated by the first distance calculating unit 24.

When the difference between the parallax dx and the estimated parallax dx' is out of a second predetermined range (intrinsic range of the vehicle 10 varying according to the mounting precision of the infrared cameras 2R and 2L, the vibration of the vehicle and the like, corresponding to equal to or smaller than the second predetermined value of the present invention), the distance reliability determining unit 26 determines that the parallax offset α is greater and the reliability of Z1 is low.

When the reliability of Z1 is determined to be low by the distance reliability determining unit 26 at STEP 56, the process branches to STEP 60. On the other hand, when the reliability of Z1 is determined to be high at STEP 56, the process moves to STEP 57 where the contact determining unit 27 performs the contact determining process after STEP 11 of FIG. 3.

In the embodiments of the present invention, it is configured to image the front side of the vehicle; however, it is acceptable to image the other directions, for example, the back side or the lateral sides of the vehicle to determine the contact possibility to the target object.

In the embodiments of the present invention, the infrared cameras 2R and 2L are used as the imaging units; however, a visual camera for imaging a visual image may also be used.

INDUSTRIAL APPLICABILITY

As mentioned above, the vehicle periphery monitoring device of the present invention can recognize precisely the distance from the vehicle to the target object on the basis of the parallax variation rate of the image section of the target object extracted from the images imaged by two cameras; therefore, it is usable in monitoring the periphery of the vehicle.

What is claimed is:

1. A vehicle periphery monitoring device, comprising:
   a first imaging device mounted on a vehicle and configured to monitor a periphery of the vehicle;
   a second imaging device mounted on the vehicle having an overlapped imaging range with the first imaging device; and
   a computer configured to receive imaging data from the first and second imaging devices, wherein the computer includes:
   a target object extracting unit configured to extract a first image section of a target object in real space from a first image imaged by the first imaging unit at a predetermined time;
   a corresponding image extracting unit configured to extract a second image section correlated to the first image section from a second image imaged by the second imaging unit at the predetermined time;

a parallax calculating unit configured to calculate a parallax between the first image section and the second image section;

a parallax variation rate calculating unit configured to calculate a parallax variation rate per predetermined time interval on the basis of the parallax calculated by the parallax calculating unit in time series for the target object;

a velocity detecting unit configured to detect a vehicular velocity of the vehicle; and a first distance calculating unit configured to calculate a distance from the vehicle to the target object on the basis of the parallax variation rate and the vehicular velocity, wherein the first distance calculating unit is configured to shift a sampling interval to calculate a theoretical parallax variation rate on the basis of a theoretical time-series parallax data calculated on assumption that a mounting behavior of the first imaging unit and the second imaging unit to the vehicle satisfies a predetermined condition and the vehicle is travelling at the vehicular velocity detected by the velocity detecting unit, and calculates the distance from the vehicle to the target object on the basis of the theoretical time-series parallax data in a sampling interval wherein the theoretical parallax variation rate matches the parallax variation rate calculated by the parallax variation rate calculating unit.

2. The vehicle periphery monitoring device according to claim 1, wherein the first distance calculating unit is configured to calculate the distance from the vehicle to the target object on the basis of the parallax variation rate and the vehicular velocity on condition that the vehicular velocity is equal to or greater than a predetermined velocity.

3. A vehicle periphery monitoring device, comprising:
a first imaging device mounted on a vehicle and configured to monitor a periphery of the vehicle;
a second imaging device mounted on the vehicle having an overlapped imaging range with the first imaging device; and
a computer configured to receive imaging data from the first and second imaging devices, wherein the computer includes:
a target object extracting unit configured to extract a first image section of a target object in real space from a first image imaged by the first imaging unit at a predetermined time;
a corresponding image extracting unit configured to extract a second image section correlated to the first image section from a second image imaged by the second imaging unit at the predetermined time;
a parallax calculating unit configured to calculate a parallax between the first image section and the second image section;
a parallax variation rate calculating unit configured to calculate a parallax variation rate per predetermined time interval on the basis of the parallax calculated by the parallax calculating unit in time series for the target object;
a velocity detecting unit configured to detect a vehicular velocity of the vehicle;
a first distance calculating unit configured to calculate a distance from the vehicle to the target object on the basis of the parallax variation rate and the vehicular velocity;
a second distance calculating unit configured to calculate a distance from the vehicle to the target object in real space corresponding to the first image section on the basis of one parallax calculated by the parallax calculating unit; and
a distance reliability determining unit configured to stop a monitoring process which monitors the target object on the basis of the distance from the vehicle to the target object calculated by the first distance calculating unit on condition that a difference between the distance from the vehicle to the target object in real space calculated by the first distance calculating unit and the distance from the identical target object in real space to the vehicle calculated by the second distance calculating unit is equal to or greater than a first predetermined value.

4. A vehicle periphery monitoring device, comprising:
a first imaging device mounted on a vehicle and configured to monitor a periphery of the vehicle;
a second imaging device mounted on the vehicle having an overlapped imaging range with the first imaging device; and
a computer configured to receive imaging data from the first and second imaging devices, wherein the computer includes:
a target object extracting unit configured to extract a first image section of a target object in real space from a first image imaged by the first imaging unit at a predetermined time;
a corresponding image extracting unit configured to extract a second image section correlated to the first image section from a second image imaged by the second imaging unit at the predetermined time;
a parallax calculating unit configured to calculate a parallax between the first image section and the second image section;
a parallax variation rate calculating unit configured to calculate a parallax variation rate per predetermined time interval on the basis of the parallax calculated by the parallax calculating unit in time series for the target object;
a velocity detecting unit configured to detect a vehicular velocity of the vehicle;
a first distance calculating unit configured to calculate a distance from the vehicle to the target object on the basis of the parallax variation rate and the vehicular velocity;
an estimated parallax calculating unit configured to calculate an estimated parallax between the first image section and the second image section on the basis of the distance calculated by the first distance calculating unit; and
a distance reliability determining unit configured to stop a monitoring process which monitors the target object on the basis of the distance from the vehicle to the target object calculated by the first distance calculating unit on condition that a difference between the parallax calculated by the parallax calculating unit and the estimated parallax is equal to or greater than a second predetermined value.

5. A vehicle periphery monitoring device, comprising:
a first imaging device mounted on a vehicle and configured to monitor a periphery of the vehicle;
a second imaging device mounted on the vehicle having an overlapped imaging range with the first imaging device; and
a computer configured to receive imaging data from the first and second imaging devices, wherein the computer includes:
a target object extracting unit configured to extract a first image section of a target object in real space from a first image imaged by the first imaging unit at a predetermined time;

a corresponding image extracting unit configured to extract a second image section correlated to the first image section from a second image imaged by the second imaging unit at the predetermined time;

a parallax calculating unit configured to calculate a parallax between the first image section and the second image section;

a parallax variation rate calculating unit configured to calculate a parallax variation rate per predetermined time interval on the basis of the parallax calculated by the parallax calculating unit in time series for the target object;

a velocity detecting unit configured to detect a vehicular velocity of the vehicle; and a first distance calculating unit configured to calculate a distance from the vehicle to the target object on the basis of the parallax variation rate and the vehicular velocity, wherein the first distance calculating unit is configured to calculate the distance from the vehicle to the target object on the basis of the parallax variation rate and the vehicular velocity on condition that the vehicular velocity is equal to or greater than a predetermined velocity.

* * * * *